(12) United States Patent
Hayashi et al.

(10) Patent No.: US 9,719,459 B2
(45) Date of Patent: Aug. 1, 2017

(54) SLIDING COMPONENT FOR INTERNAL COMBUSTION ENGINE AND METHOD OF MANUFACTURING SLIDING COMPONENT FOR INTERNAL COMBUSTION ENGINE

(71) Applicant: AISIN SEIKI KABUSHIKI KAISHA, Kariya-shi (JP)

(72) Inventors: Takayuki Hayashi, Toyokawa (JP); Hiroyoshi Hiejima, Kariya (JP); Keiki Sugano, Chita-gun (JP); Akihiro Okamoto, Nishio (JP); Takuya Niimi, Handa (JP); Ryo Okazaki, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 274 days.

(21) Appl. No.: 14/538,173

(22) Filed: Nov. 11, 2014

(65) Prior Publication Data

US 2015/0128894 A1 May 14, 2015

(30) Foreign Application Priority Data

Nov. 13, 2013 (JP) .................................. 2013-235215

(51) Int. Cl.
*F02F 3/10* (2006.01)
*B23P 15/10* (2006.01)

(52) U.S. Cl.
CPC ............. *F02F 3/105* (2013.01); *B23P 15/10* (2013.01); *Y10T 29/49249* (2015.01)

(58) Field of Classification Search
CPC ...... F02F 3/105; F02F 3/10; Y10Y 29/49249; B23P 15/10
See application file for complete search history.

(56) References Cited

U.S. PATENT DOCUMENTS

| 8,069,773 B2 * | 12/2011 | Suzuki | ................... F01M 11/00 92/155 |
| 8,430,020 B2 | 4/2013 | Fujiwara et al. | |
| 2012/0186561 A1 * | 7/2012 | Bethel | ................... F02B 75/282 123/51 R |

FOREIGN PATENT DOCUMENTS

| JP | 2006-161563 A | 6/2006 |
| JP | 2006-275002 | 10/2006 |
| JP | 2007-169754 | 7/2007 |
| JP | 2009-052451 A | 3/2009 |
| JP | 2009-68584 | 4/2009 |
| JP | 2010-90812 | 4/2010 |
| JP | 2012-246863 | 12/2012 |
| WO | 2010/044216 A1 | 4/2010 |

OTHER PUBLICATIONS

Military University of Technology, Mechanical Faculty Gen. Sylwestra Kaliskiego 2, 00-908 Warsaw, Poland, "http://yadda.icm.edu.pl/yadda/element/bwmeta1.element.baztech-article-BUJ8-0003-0016/c/httpwww_bg_utp_edu_plartjok32008jo20kones20200820no20320vol201520napadlek.pdf".*

Office Action issued May 9, 2017 in Japanese Patent Application No. 2013-235215 (with English Translation).

* cited by examiner

*Primary Examiner* — Kevin A Lathers
(74) *Attorney, Agent, or Firm* — Oblon, McClelland, Maier & Neustadt, L.L.P.

(57) ABSTRACT

A sliding component for an internal combustion engine includes: a sliding component main body that includes a plurality of concave portions formed in a predetermined portion thereof; and a coating layer that covers a portion of the sliding component main body, in which the plurality of concave portions are not formed.

10 Claims, 9 Drawing Sheets

REFERENCE EXAMPLE 1 (OPENING WIDTH D1=20 μm, PITCH L1=80 μm)

REFERENCE EXAMPLE 2 (OPENING WIDTH D1=20 μm, PITCH L1=100 μm)

REFERENCE EXAMPLE 3 (OPENING WIDTH D1=30 μm, PITCH L1=90 μm)

REFERENCE EXAMPLE 4 (OPENING WIDTH D1=60 μm, PITCH L1=210 μm)

TEST SPECIMEN OF EXAMPLE AFTER FRICTIONAL TEST

— TEST REGION

TEST SPECIMEN OF COMPARATIVE EXAMPLE 2 AFTER FRICTIONAL TEST

— TEST REGION

FIRST MODIFICATION EXAMPLE

SECOND MODIFICATION EXAMPLE

SLIDING COMPONENT FOR INTERNAL COMBUSTION ENGINE AND METHOD OF MANUFACTURING SLIDING COMPONENT FOR INTERNAL COMBUSTION ENGINE

CROSS REFERENCE TO RELATED APPLICATIONS

This application is based on and claims priority under 35 U.S.C. §119 to Japanese Patent Application 2013-235215, filed on Nov. 13, 2013, the entire contents of which are incorporated herein by reference.

TECHNICAL FIELD

This disclosure relates to a sliding component for an internal combustion engine and a method of manufacturing the sliding component for an internal combustion engine.

BACKGROUND DISCUSSION

The related art discloses a sliding component with a coating layer for an internal combustion engine, and a method of manufacturing the sliding component with the coating layer for an internal combustion engine (for example, refer to JP 2009-68584A (Reference 1)).

Reference 1 discloses a piston (sliding component for an internal combustion engine), the surface of which is provided with a lubricating film (coating layer) made of heat-resistant resin. The frictional coefficient of the sliding section of the piston is decreased by the formation of the lubricating film on the piston, thereby preventing the occurrence of a large frictional force on the surface of the piston.

However, when the piston disclosed in Reference 1 continues to slide in the internal combustion engine for a predetermined period while being disposed therein, the lubricating film formed on the piston deteriorates and peels therefrom, and after the lubricating film peels from the piston, it is necessary to prevent an increase in the frictional force of the surface of the piston simply by oil being supplied to the internal combustion engine. In this case, since the surface of the piston cannot maintain sufficient oil when the viscosity of the oil is low or when the oil is not sufficiently supplied to the internal combustion engine, there is a problem in that a large frictional force occurs on the surface of the piston.

SUMMARY

Thus, a need exists for a sliding component for an internal combustion engine and a method of manufacturing the sliding component for an internal combustion engine which is not suspectable to the drawback mentioned above.

A first aspect of this disclosure is directed to a sliding component for an internal combustion engine including: a sliding component main body that includes a plurality of concave portions formed in a predetermined portion thereof; and a coating layer that covers a portion of the sliding component main body, in which the plurality of concave portions are not formed.

A second aspect of this disclosure is directed to a method of manufacturing a sliding component for an internal combustion engine including: preparing a sliding component main body; forming a coating layer on a predetermined surface of the sliding component main body; and forming a plurality of hole portions in the coating layer through a laser ablation process in which a laser beam having an ultrashort pulse is applied to the coating layer under predetermined laser beam application conditions, and forming a plurality of concave portions in portions of the sliding component main body, which correspond to the plurality of hole portions, respectively.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the accompanying drawings.

The configuration of a piston 100 according to the embodiment disclosed here will be described with reference to FIGS. 1 to 6. The piston 100 is an example of a "sliding component for an internal combustion engine" of this disclosure.

Figure 1:
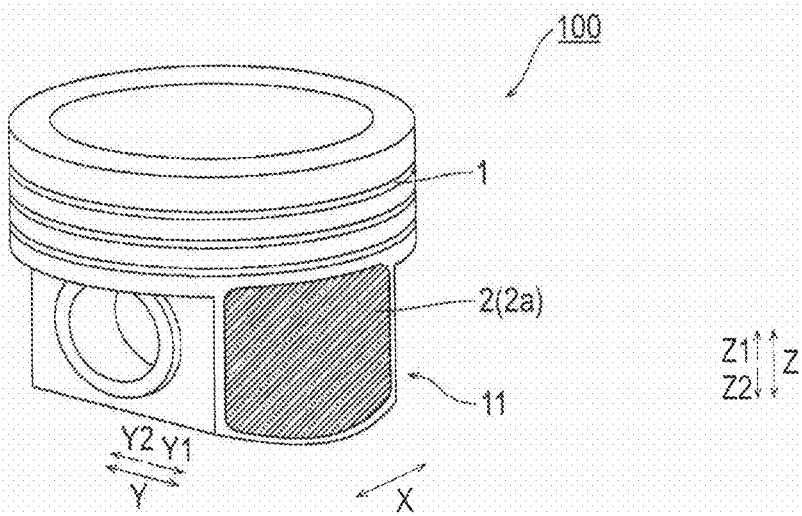
FIG. 1 is a perspective view illustrating a piston according to an embodiment of this disclosure.

The piston 100 of the embodiment disclosed here is a mechanical component used in the internal combustion engine (not illustrated) of a vehicle. As illustrated in FIG. 1, the piston 100 includes a piston main body 1 made of aluminum alloy casting, and a resin layer 2 that is made of heat-resistant thermosetting resin such as polyamide-imide resin containing molybdenum disulfide particles. The resin layer 2 is formed on a skirt section 11 of the piston main body 1. The skirt section 11 is positioned on a side portion of the piston main body 1 so as to slide against an inner circumferential surface 101a (refer to FIGS. 4 to 6) of a cylinder 101. The piston main body 1 is an example of a "sliding component main body" of this disclosure, and the skirt section 11 is an example of a "predetermined portion" and a "sliding portion" of this disclosure. The resin layer 2 is an example of a "coating layer" of this disclosure.

Figure 2:
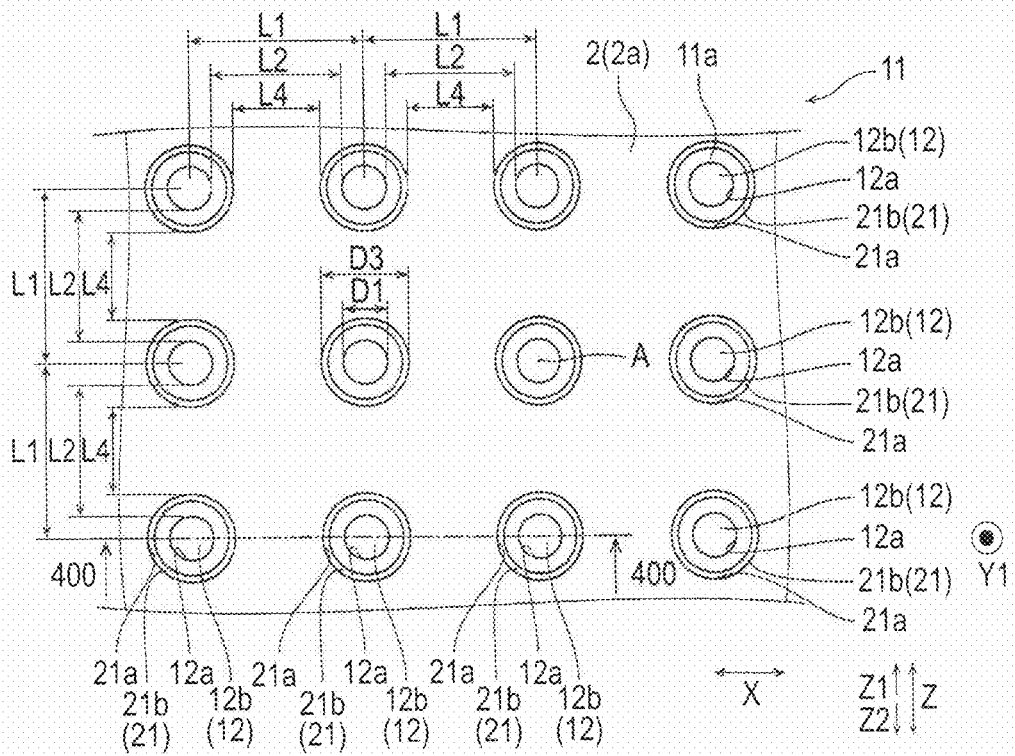
FIG. 2 is an enlarged view illustrating a skirt section of the piston according to the embodiment of this disclosure.
Figure 3:
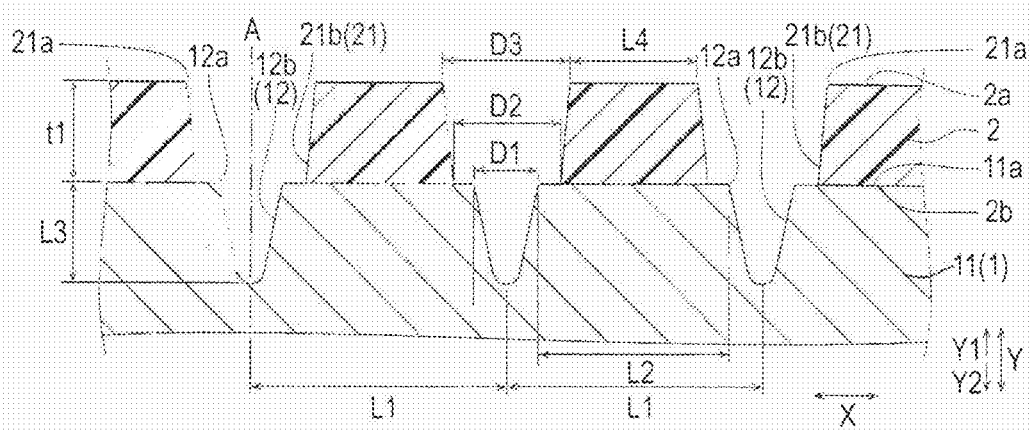
FIG. 3 is an enlarged cross-sectional view illustrating the skirt section taken along line in FIG. 2.

As illustrated in FIG. 2, the skirt section 11 of the piston main body 1 is provided with a plurality of concave portions 12, each of which has a substantially circular opening end edge 12a. The plurality of concave portions 12 are provided in a pre-set regular pattern so as to line up in an X direction and a Z direction (in-plane direction) with a pitch L1 of approximately 40 μm or greater and approximately 240 μm or less interposed therebetween. As illustrated in FIG. 3, each of the plurality of concave portions 12 has a substantially inverted conical shape, and the inner diameter of a surface 12b of the concave portion 12 gradually decreases from the opening end edge 12a toward a depth direction (Y direction).

The opening width (inner diameter) D1 of the opening end edge 12a of the concave portion 12 is less than the pitch L1 of the concave portions 12, and is approximately 10 μm or greater and approximately 60 μm or less. The opening width D1 is preferably approximately 20 μm or greater and approximately 30 μm or less, and in this case, the pitch L1 of the concave portions 12 is preferably approximately 80 μm or greater and approximately 100 μm or less. A gap L2 between the adjacent concave portions 12 is greater than the opening width D1 of the opening end edge 12a of the concave portion 12. A depth L3 of the concave portion 12 in a Y direction is approximately 7 μm or greater and approximately 200 μm or less.

There are almost no burrs (projections that protrude upward (toward a Y1 direction) from the opening end edge 12a of the concave portion 12) at the opening end edge 12a of the concave portion 12. A surface 11a of the region of the skirt section 11 of the piston main body 1, which is not provided with the plurality of concave portions 12, is polished so as to have a roughness (arithmetic mean roughness) Ra of approximately 0.3 μm or less. That is, the surface 11a of the region not provided with the plurality of concave portions 12 is polished so as to have a mirror surface.

Here, in the embodiment, a plurality of hole portions 21 are formed in the resin layer 2 formed on the surface 11a of the skirt section 11, and the hole portion 21 has a substantially circular opening end edge (angled portion) 21a, and passes through the resin layer 2 in the Y direction. The plurality of hole portions 21 are respectively provided in portions of the skirt section 11 corresponding to the plurality of concave portions 12. As a result, the surfaces 12b of the plurality of concave portions 12 of the piston main body 1 are respectively exposed via the plurality of corresponding hole portions 21. Similar to the plurality of concave portions 12, the plurality of hole portions 21 are provided in a pre-set regular pattern so as to line up in the X direction and the Z direction with the pitch L1 interposed therebetween.

In the embodiment, the concave portions 12 and the hole portions 21 corresponding to each other are concurrently formed by a laser ablation process which will be described later. Accordingly, an inner circumferential surface 21b of the hole portion 21 and the opening end edge 12a of the corresponding concave portion 12 have substantially the respective circular shapes (concentric circular shapes), the centers of which coincide substantially with each other when seen from the depth direction (Y direction) in which a center line A of the hole portion 21 extends. In addition, the concave portion 12 and the hole portion 21 corresponding to each other have the center line A in common.

Each of the plurality of hole portions 21 has a substantially inverted conical shape, and the inner diameter of the inner circumferential surface 21b of the hole portion 21 gradually decreases from an upper surface 2a (Y1 direction) of the resin layer 2 toward a lower surface 2b (Y2 direction). An inner diameter D2 of the inner circumferential surface 21b in of the lower surface 2b, and an inner diameter D3 of the inner circumferential surface 21b (opening end edge 21a) of the upper surface 2a are greater than the opening width (inner diameter) D1 of the opening end edge 12a of the concave portion 12.

The inner diameter D3 of the inner circumferential surface 21b of the upper surface 2c is less than the pitch L1 of the adjacent hole portions 21, and is approximately 35 μm or greater and approximately 65 μm or less. A gap L4 of the adjacent hole portions 21 is preferably greater than or equal to the opening width D1 of the opening end edge 12a of the concave portion 12. The depth of the hole portion 21 in the Y direction (the thickness t1 of the resin layer 2) is approximately 5 μm or greater and approximately 17 μm or less.

The resin layer 2 covers the portion of the surface 11a of the skirt section 11, in which the plurality of concave portions 12 are not formed. The upper surface 2a of the resin layer 2 is exposed to the outside (Y1 direction), and the flat upper surface 2a is formed. The upper surface 2a is an example of an "outer surface" of this disclosure.

Figure 4:
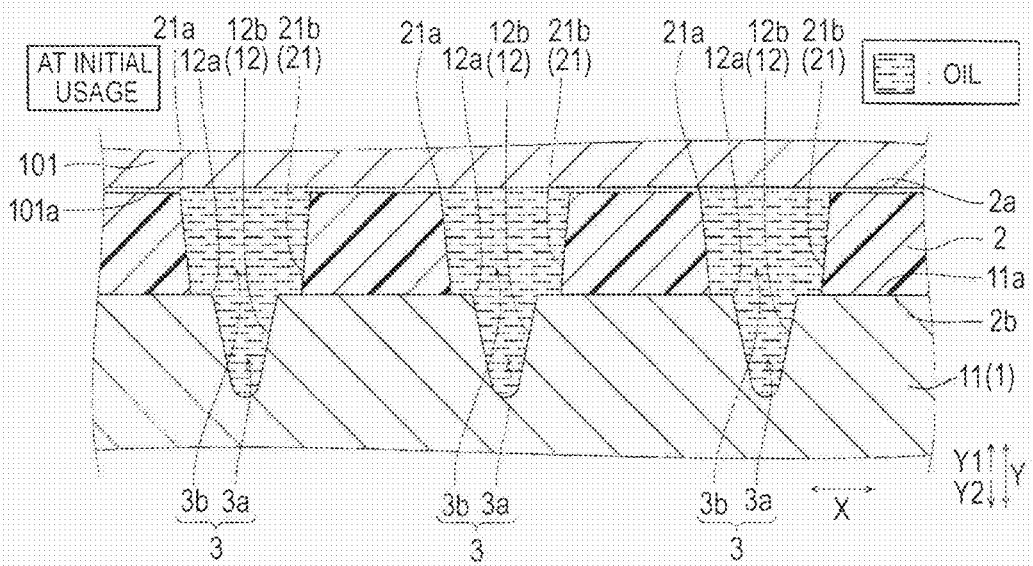
FIG. 4 is an enlarged cross-sectional view illustrating the skirt section according to the embodiment of this disclosure before a resin layer peels therefrom (at an initial usage)

As illustrated in FIG. 4, both the concave portion 12 and the hole portion 21 form an oil reservoir 3 that temporarily stores the oil supplied to an internal combustion engine from the initial usage of the piston 100 until the resin layer 2 peels from the piston 100. That is, the oil reservoir 3 is formed by an oil reservoir 3a of the concave portion 12 and an oil reservoir 3b of the hole portion 21. Accordingly, even when the oil is not sufficiently supplied to the internal combustion engine, the oil stored in the oil reservoir 3 is supplied to the upper surface 2a of the resin layer 2, and the cylinder 101 and the piston 100 (the resin layer 2) face each other with the oil interposed therebetween, and thus direct contact between the cylinder 101 and the resin layer 2 is prevented. In addition, when the oil is stored in the entirety of the oil reservoir 3, the oil stored in the oil reservoir 3b of the hole portion 21 prevents the cylinder 101 from coming into direct contact with the inner circumferential surface 21b (the opening end edge 21a) of the upper surface 2a (the surface in the Y1 direction) of the resin layer 2.

Figure 5:
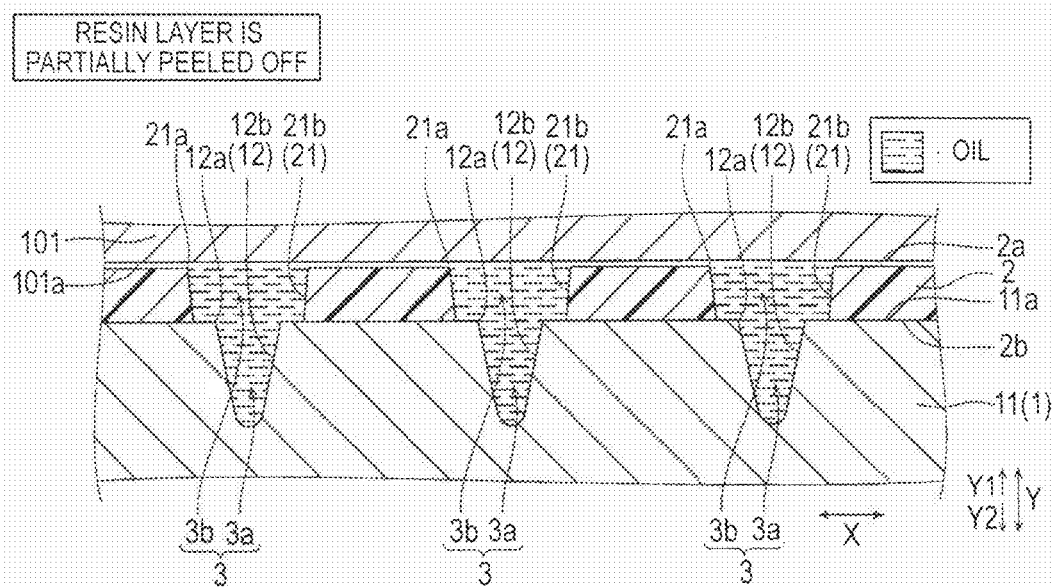
FIG. 5 is an enlarged cross-sectional view illustrating the skirt section according to the embodiment of this disclosure after the resin layer peels partially therefrom.

As illustrated in FIG. 5, even after the resin layer 2 opposite to the cylinder 101 peels partially from the piston 100 due to the continuous sliding motion of the piston 100 in the internal combustion engine (not illustrated) during a predetermined period, both of the concave portion 12 and the hole portion 21 maintain the oil reservoir 3 that temporarily stores the oil supplied to the internal combustion engine. Since the resin layer 2 opposite to the cylinder 101 peels partially from the piston 100, the hole portion 21 decreases in size more so than during the initial usage, however, the capacity of the concave portion 12 does not change. For this reason, even when the resin layer 2 peels partially from the piston 100, the oil is sufficiently stored in the oil reservoir 3.

Figure 6:
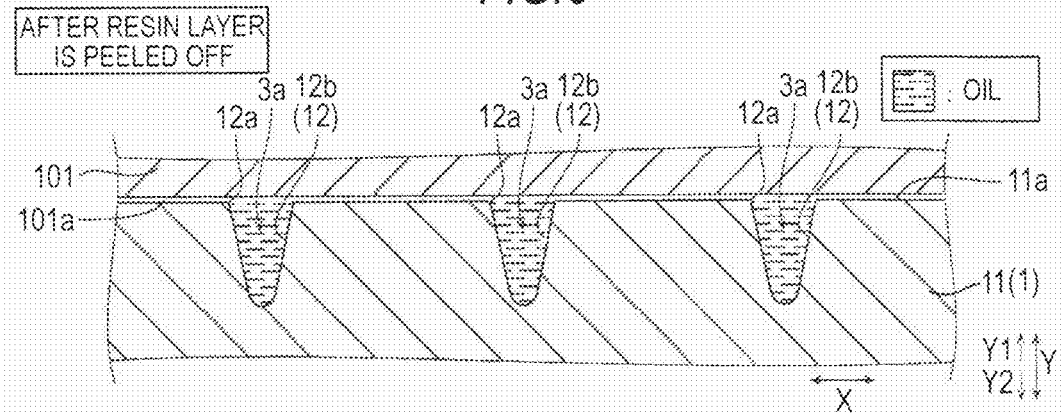
FIG. 6 is an enlarged cross-sectional view illustrating the skirt section according to the embodiment of this disclosure after the resin layer peels therefrom.

As illustrated in FIG. 6, even after the resin layer 2 deteriorates, and peels from the piston 100 due to the extended continuous sliding motion of the piston 100 in the internal combustion engine (not illustrated), the oil reservoir 3a is formed by the concave portion 12. Accordingly, even when the oil is not sufficiently supplied to the internal combustion engine, the oil stored in the oil reservoir 3a is supplied to the surface 11a of the piston main body 1, and a cylinder 101 and the piston main body 1 face each other with the oil interposed therebetween, and thus direct contact between the cylinder 101 and the piston main body 1 is prevented.

In the embodiment, it is possible to obtain the following effects.

In the embodiment, as described above, since it is possible to use the plurality of concave portions 12 as the oil reservoirs 3a that store the oil supplied to the internal combustion engine, even after the resin layer 2 formed on the piston main body 1 peels therefrom, by providing the plurality of concave portions 12 in the skirt section 11 of the piston main body 1, it is possible to supply the oil stored in the plurality of concave portions 12 to the surface 11a of the piston main body 1 even when the surface 11a of the piston main body 1 is not coated with sufficient oil. Accordingly, since the surface 11a of the piston main body 1 can maintain sufficient oil, it is possible to reduce the frictional force of the surface 11a of the piston main body 1.

In the embodiment, since the resin layer 2 is formed on the piston main body 1, it is possible to prevent the occurrence of a large frictional force on the surface (the upper surface 2a of the resin layer 2) of the piston 100 before the resin layer 2 peels from the piston main body 1. Since the resin layer 2 covers the portion of the surface 11a of the skirt section 11, in which the plurality of concave portions 12 are not formed, it is possible to use the plurality of concave portions 12 as the oil reservoirs even before the resin layer 2 peels from the piston main body 1. In addition, since the plurality of concave portions 12 are not filled with the resin layer 2, the filling the concave portions 12 with the resin layer can be prevented from reducing the capacity of each of the concave portions 12. Accordingly, since the oil can be sufficiently stored in the plurality of concave portions 12, and thus, the upper surface 2a of the piston 100 can maintain sufficient oil, it is possible to reduce the frictional force of the upper surface 2a of the piston 100. As a result, before and after the resin layer 2 peels from the piston main body 1, an increase in the temperature of the internal combustion engine induced by an increase in frictional force can be prevented from causing engine seizure and energy loss, and thereby it is possible to improve the performance of the internal combustion engine.

In the embodiment, since the plurality of concave portions 12 are not filled with the resin layer 2, the capacity of each of the concave portions 12 is not affected even when the resin layer 2 is partially scraped off, and thereby it is possible to prevent the oil reservoir 3 (3a) from not being able to sufficiently store the oil.

In the embodiment, since the plurality of hole portions 21 are provided in the resin layer 2 in such a manner that the surfaces 12b of the plurality of concave portions 12 of the piston main body 1 are respectively exposed via the plurality of corresponding hole portions 21, it is thereby possible to dispose the resin layer 2 in a wide range of the piston main body 1 compared to when the plurality of concave portions 12 are not respectively at the positions corresponding to the plurality of hole portions 21, and only a part of the piston main body 1 is covered with the resin layer 2, in which the covered part has an island shape, it is possible to prevent the occurrence of a large frictional force on the upper surface 2a of the piston 100.

In the embodiment, both of the concave portion 12 and the hole portion 21 form the oil reservoir 3 that temporarily stores the oil supplied to the internal combustion engine from the initial usage of the piston 100 until the resin layer 2 peels from the piston 100. Accordingly, it is possible to sufficiently store the oil by also using the hole portions 21 of the resin layer 2 as the oil reservoir 3 in addition to the concave portions 12 of the piston main body 1. Accordingly, since the upper surface 2a of the piston 100 can maintain sufficient oil before the resin layer 2 peels from the piston 100, it is possible to reduce the frictional force of the upper surface 2a of the piston 100. Since the oil stored in the oil reservoir 3b of the hole portion 21 of the resin layer 2 can prevent the cylinder 101 from coming into direct contact with the resin layer 2 positioned at the opening end edge (angled portion) 21a of the hole portion 21, it is possible to prevent the resin layer 2 from peeling from the opening end edge 21a of the hole portion 21.

In the embodiment, the inner circumferential surface 21b of the hole portion 21 and the opening end edge 12a of the corresponding concave portion 12 have substantially the respective circular shapes (concentric circular shapes), the centers of which coincide substantially with each other when seen from the depth direction (Y direction) in which the center line A of the hole portion 21 extends. Accordingly, since it is possible to more reliably expose the surfaces 12b of the plurality of concave portions 12 via the plurality of corresponding hole portions 21, respectively, it is possible to more reliably use the plurality of concave portions 12 as the oil reservoirs 3a before the resin layer 2 peels from the piston 100.

In the embodiment, the inner diameter D2 of the inner circumferential surface 21b of the lower surface 2b, and the inner diameter D3 of the inner circumferential surface 21b (the opening end edge 21a) of the upper surface 2a are greater than the opening width (inner diameter) D1 of the opening end edge 12a of the concave portion 12. Accordingly, since it is possible to easily expose the surface 12b of the concave portion 12 of the piston main body 1 via the hole portion 21 of the resin layer 2, which has an inner diameter greater than the opening width D1 of the opening end edge 12a, it is possible to reliably use the plurality of concave portions 12 as the oil reservoirs 3a before the resin layer 2 peels from the piston main body 1.

In the embodiment, since the plurality of concave portions 12 and the plurality of hole portions 21 are provided in a pre-set regular pattern so as to line up in the X direction and the Z direction with the pitch L1 interposed therebetween, it is possible to reduce variations in the position of each of the plurality of concave portions 12 used as the oil reservoirs 3a, unlike when the plurality of hole portions 21 of the resin layer 2 or the plurality of concave portions 12 of the piston main body 1 are randomly formed, and as a result, it is possible to prevent the surface 11a (or the upper surface 2a of the piston 100) of the piston main body 1 from unevenly maintaining the oil. Accordingly, since it is possible to prevent a portion of the surface 11a of the piston main body 1 (or the upper surface 2a of the piston 100) from maintaining insufficient oil, it is possible to reduce the frictional force of the surface 11a of the piston main body 1 (or the upper surface 2a of the piston 100).

In the embodiment, since the flat portion of the upper surface 2a of the resin layer 2 is formed, in which the plurality of hole portions 21 are not formed and which is exposed to the outside (Y1 direction), thereby it is possible to further increase a facing area between the piston 100 and the cylinder 101 which face each other with the oil interposed therebetween, compared to when the upper surface 2a of the resin layer 2 have a shape of concavity and convexity, it is possible to prevent an increase in surface pressure applied to the skirt section 11 of the piston 100, which faces the cylinder 101. Accordingly, it is possible to effectively prevent an increase in the frictional force of the upper surface 2a of the piston 100.

In the embodiment, since the gap L2 of the adjacent concave portions 12 is greater than the opening width D1 of the opening end edge 12a of the concave portion 12, it is thereby possible to prevent a decrease in the gap L2 of the adjacent concave portions 12, and it is possible to secure the portion of the surface 11a of the piston main body 1, in which the concave portions 12 are not formed. Accordingly, since it is possible to secure a sufficient facing area between the piston main body 1 and the cylinder 101 which face each other with the oil interposed therebetween after the resin layer 2 peels from the piston main body 1, it is possible to prevent an increase in surface pressure applied to the portion of the piston main body 1, which faces the cylinder 101. As a result, it is possible to prevent an increase in the frictional force of the surface 11a of the piston main body 1.

In the embodiment, since it is possible to easily form the resin layer 2 made of thermosetting resin with the flat upper surface 2a by coating the skirt section 11 with a resin material and applying a heat treatment to the skirt section 11, it is possible to prevent an increase in the frictional force of the upper surface 2a of the piston 100.

In the embodiment, since the surface 11a of the region of the skirt section 11 of the piston main body 1, which is not provided with the plurality of concave portions 12, is polished so as to have the roughness (arithmetic mean roughness) Ra of approximately 0.3 μm or less, it is possible to reliably prevent an increase in the frictional force of the polished surface 11a that is not provided with the plurality of concave portions 12 even when the resin layer 2 peels from the piston main body 1.

Subsequently, a process of manufacturing the piston 100 according to the embodiment disclosed here will be described with reference to FIGS. 1, 2, 7, and 8.

First, the piston main body 1 made of aluminum alloy casting is manufactured (prepared) by using a predetermined mold (not illustrated) and the like. The surface 11a of the skirt section 11 of the piston main body 1 is polished so as to have the roughness Re of approximately 0.3 μm or less, thereby making the surface 11a a mirror surface. Thereafter, the resin layer 2 of a uniform thickness t1 (refer to FIG. 3) is formed by coating the polished surface 11a of the skirt section 11 of the piston main body 1 with heat-resistant thermosetting resin, and then applying a heat treatment to the surface 11a. At this time, the flat upper surface 2a of the resin layer 2 is formed.

Figure 7:
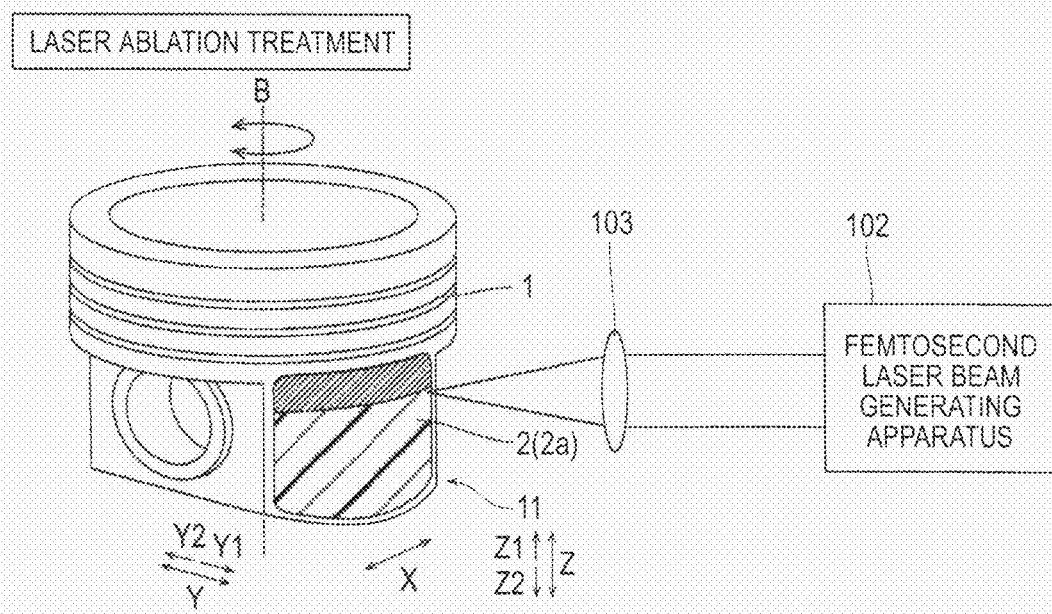
FIG. 7 is a schematic view illustrating a process (laser ablation process) of manufacturing the piston according to the embodiment of this disclosure.

Here, in the manufacturing process of the embodiment, a laser ablation process is applied to the resin layer 2 so as to form the plurality of concave portions 12 and the plurality of hole portions 21 in a pre-set regular pattern. Specifically, as illustrated in FIG. 7, a femtosecond laser beam generating apparatus 102 generates a laser beam having an ultrashort pulse, the width of which is approximately 700 fs (femtoseconds), and the energy of which is approximately 10 μJ. The generated laser beam having an ultrashort pulse is focused at a predetermined point of the upper surface 2a of the resin layer 2 using a lens 103. At this time, a laser beam having an ultrashort pulse is applied to the same point on the upper surface 2a of the resin layer 2 multiple times in the depth direction (Y direction) substantially perpendicular to the upper surface 2a. At this time, the conditions such as a beam application time are set in such a manner that the opening width D1 (refer to FIG. 3) of the opening end edge 12a of the concave portion 12 is approximately 10 μm or greater and approximately 60 μm or less.

Figure 8:
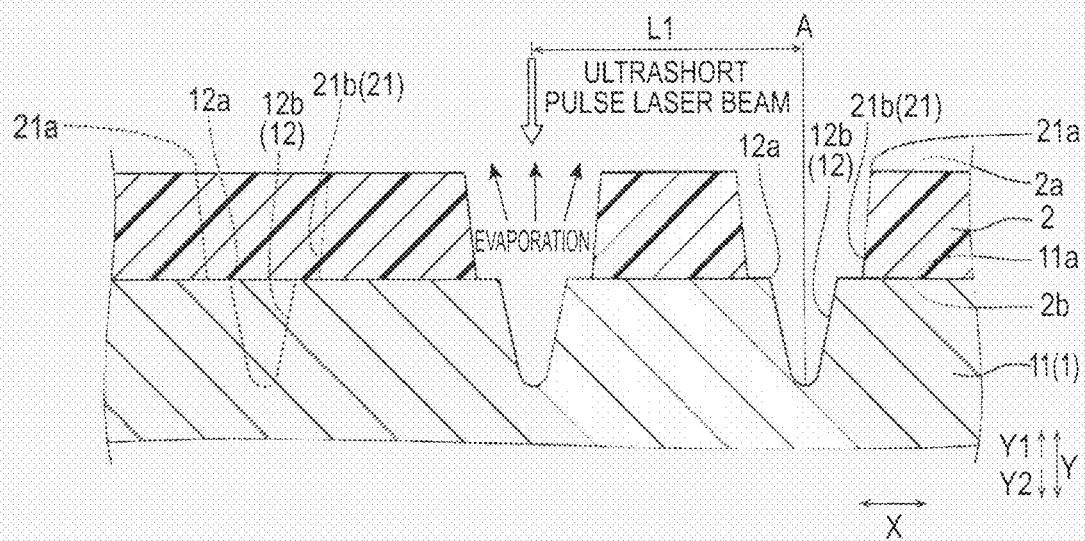
FIG. 8 is an enlarged cross-sectional view of the skirt section according to the embodiment of this disclosure when the laser ablation process is performed.
Figure 9:
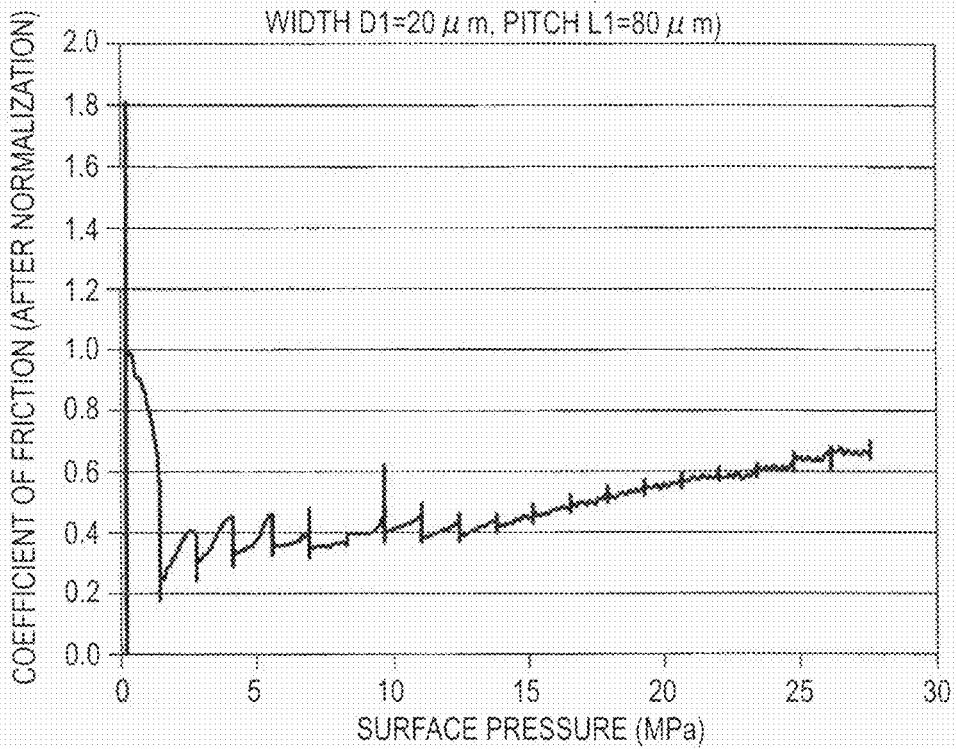
FIG. 9 is a graph illustrating a friction test result of Reference Example 1.
Figure 10:
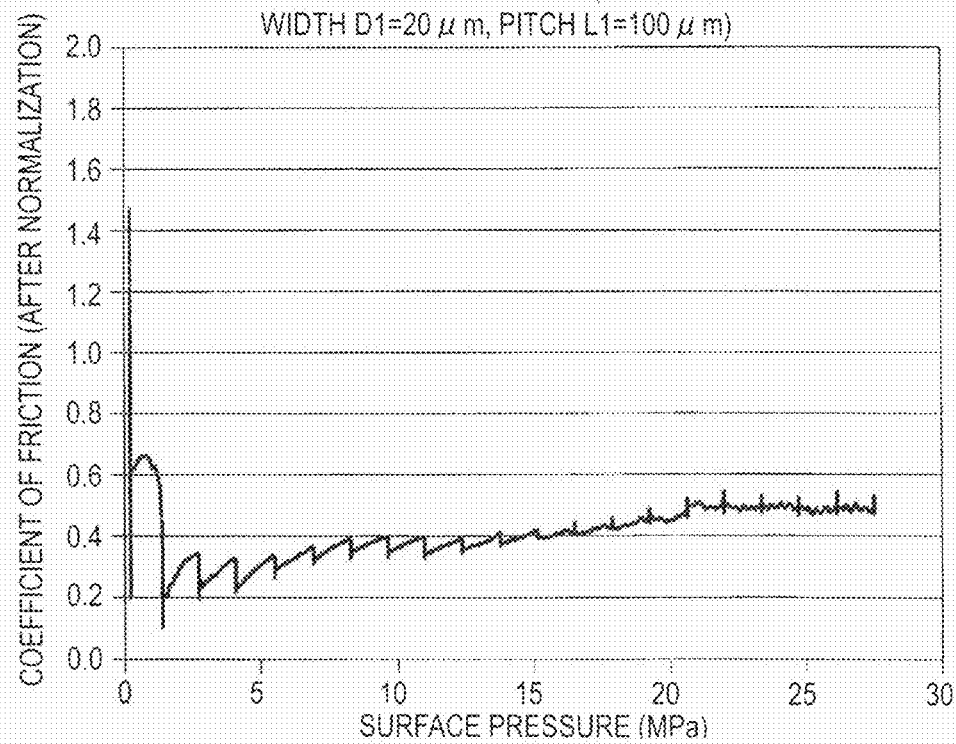
FIG. 10 is a graph illustrating a friction test result of Reference Example 2.
Figure 11:
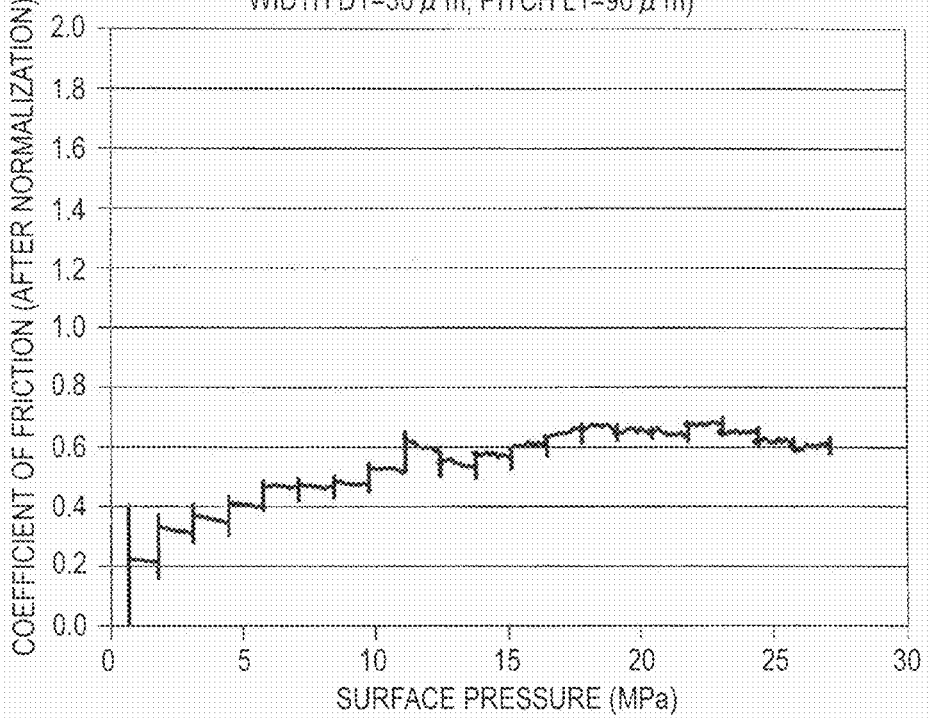
FIG. 11 is a graph illustrating a friction test result of Reference Example 3.
Figure 12:
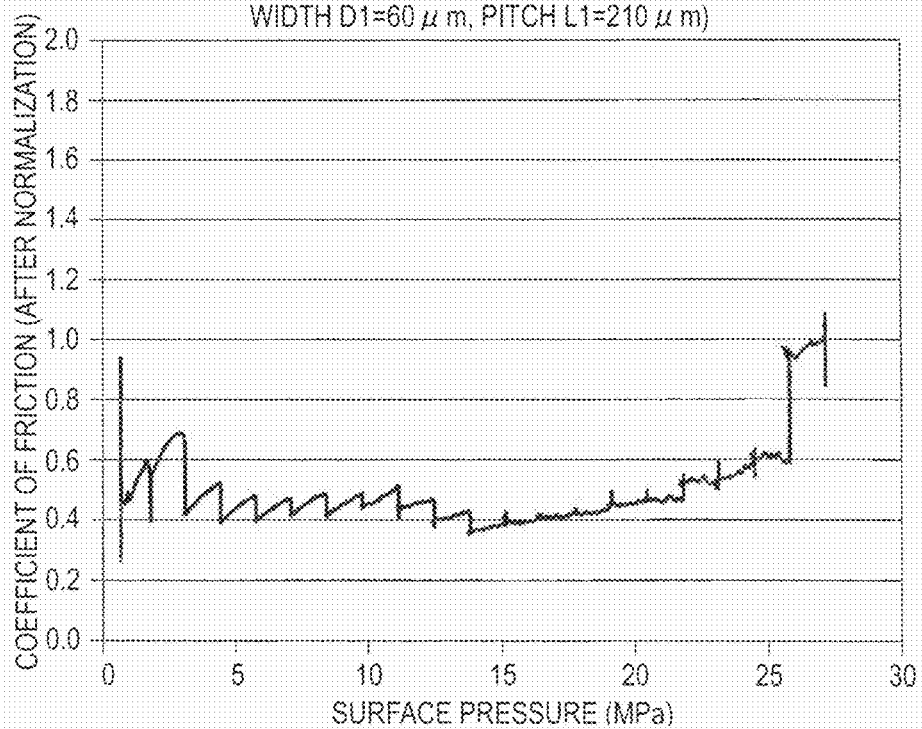
FIG. 12 is a graph illustrating a friction test result of Reference Example 4.
Figure 13:
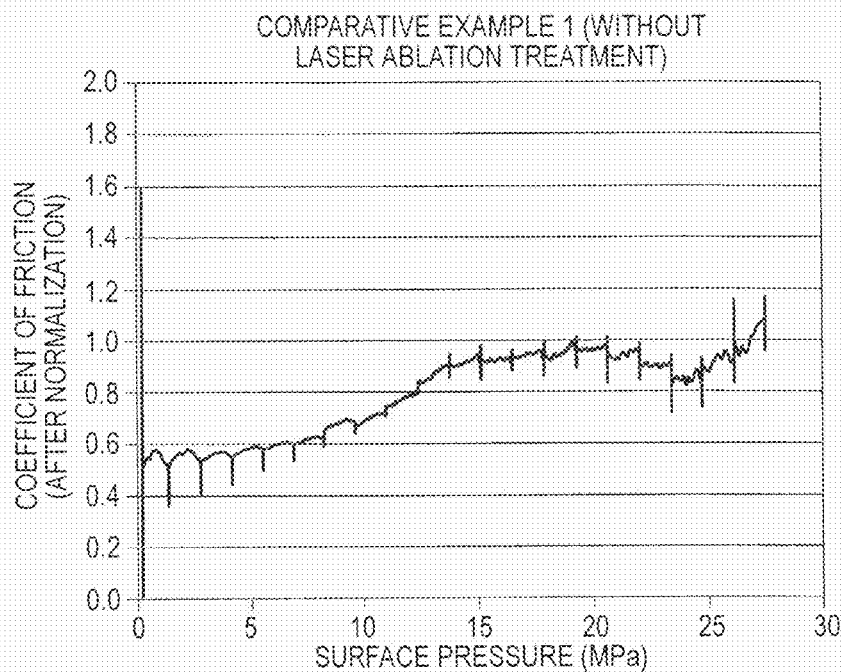
FIG. 13 is a graph illustrating a friction test result of Comparative Example 1.

Accordingly, the temperature of the laser beam application point increases sharply by the conversion of the energy of the laser beam into thermal energy. Accordingly, the resin of the resin layer 2 at the laser beam application point evaporates and scatters. As a result, as illustrated in FIG. 8, the hole portion 21 of a substantially inverted conical shape is formed at the laser beam application point on the resin layer 2 so as to pass through the resin layer 2. In addition, since the laser beam having an ultrashort pulse passing through the hole portion 21 is applied to the skirt section 11 of the piston main body 1, the aluminum alloy at the laser beam application point on the piston main body 1 evaporates and scatters. Accordingly, the concentric shaped concave portion 12 of a substantially inverted conical shape is formed at the laser beam application point on the skirt section 11, and shares the center line A in common with the hole portion 21. As a result, the concave portion 12 is provided in the portions of the skirt section 11, which correspond to the hole portion 21 of the resin layer 2, respectively, and the surface 12b of the concave portion 12 is exposed via the corresponding hole portion 21.

As such, since it is possible to concurrently form not only the hole portion 21 of the resin layer 2 but also the concave portion 12 of the piston main body 1 by applying the laser beam having an ultrashort pulse to the piston main body 1 once, it is not necessary to form a mask, a protective film, or the like compared to when the concave portion 12 and the hole portion 21 are separately formed. Accordingly, it is possible to simplify the process of manufacturing the piston 100.

After the piston main body 1 rotates about a rotary axis B (refer to FIG. 7) in order for a laser beam to be applied to a position (pre-set position) that is separate from the formation position of the concave portion 12 and the hole portion 21, the laser beam having an ultrashort pulse is applied to the position as described above. When the laser beams are repeatedly scanned in the X direction, the plurality of concave portions 12 and the plurality of hole portions 21 are formed with the predetermined pitch L1 therebetween in the X direction. Thereafter, when the piston main body 1 is moved by the predetermined pitch L1 in the Z direction, and then the laser beams are scanned in the X direction as described above, as illustrated in FIG. 2, the plurality of concave portions 12 and the plurality of hole portions 21 are provided in a pre-set regular pattern so as to line up in the X direction and the Z direction with the pitch L1 interposed therebetween.

As such, since the plurality of hole portions 21 and the plurality of concave portions 12 are formed by the laser ablation process, it is possible to easily apply a substantially uniform amount of laser beam to the substantially uniform positions (the pitch L1) when forming the hole portions 21 and the concave portions 12. Accordingly, it is possible to prevent the inner diameter and the formation position (the pitch L1) of each of the hole portion 21 and the concave portion 12 from becoming irregular, and it is possible to prevent the ejecting of the particles from causing variations in the size (outer diameter and the like) of the piston 100 depending on the points of the piston 100, compared to when forming the hole portions and the concave portions via a process (shot blasting process) in which particles are ejected to the surface at a high speed. Accordingly, not only the plurality of hole portions 21 and concave portions 12 but also the high-precision piston 100 illustrated in FIG. 1 are manufactured.

Reference Example

Subsequently, a friction test 1 will be described with reference to FIGS. 2, 3, and 9 to 13 so as to confirm the effects of preventing engine seizure after the resin layer peels from the piston.

In the friction test 1 of Reference Example 1, a flat plate made of aluminum alloy is prepared. A predetermined surface of the flat plate is polished to have the roughness (arithmetic mean roughness) Ra of 0.3 µm or less. The laser ablation process is performed in which a laser beam having an ultrashort pulse is applied to the predetermined polished surface of the flat plate under predetermined laser beam application conditions under which the width of the laser beam is approximately 700 fs and the energy of the laser beam is approximately 10 µJ. In this manner, the predetermined polished surface of the flat plate is provided with a plurality of concave portions (refer to FIG. 3), each of which has the opening width D1 of 20 µm. At this time, the plurality of concave portions are provided in the entirety of the predetermined surface in a regular pattern so as to line up in two directions (the X direction and the Z direction in FIG. 2) perpendicular to each other in an in-plane direction, with the pitch L1 (refer to FIG. 2) interposed between the concave portions. Accordingly, a test specimen of Reference Example 1 is manufactured.

A test specimen of Reference Example 2 is manufactured similar to Reference Example 1, except that the plurality of concave portions are formed with the pitch L1 of 100 µm interposed between the concave portions. That is, Reference Example 2 has the number of concave portions per unit area less than that of Reference Example 1.

A test specimen of Reference Example 3 is manufactured similar to Reference Example 1, except that the plurality of concave portions with each having the opening width D1 of 30 µm are formed with the pitch L1 of 90 µm interposed between the concave portions. That is, Reference Example 3 has the number of concave portions per unit area less than that of Reference Example 1, and the opening width D1 of the concave portion greater than that of Reference Example 1.

A test specimen of Reference Example 4 is manufactured similar to Reference Example 1, except that the plurality of concave portions with each having the opening width D1 of 60 µm are formed with the pitch L1 of 210 µm interposed between the concave portions. That is, Reference Example 4 has the number of concave portions per unit area less than that of Reference Example 3, and the opening width D1 of the concave portion greater than that of Reference Example 3.

A test specimen of Comparative Example 1 (example of the related art) of Reference Examples 1 to 4 is manufactured similar to Reference Example 1, except that the laser ablation process is not performed. That is, the flat plate material, the predetermined surface of which is polished so as to have the roughness Ra of 0.3 µm or less, is used as the test specimen of the Comparative Example 1 as it is.

Each of the test specimens of Reference Examples 1 to 4 and Comparative Example 1 is not provided with a resin layer so as to confirm the effects of preventing engine seizure after the resin layer peels from the flat plate.

The frictional coefficient of a predetermined surface of each of the test specimens of Reference Examples 1 to 4 and Comparative Example 1 is measured by a thrust cylinder-type (Suzuki type) test method. Specifically, a cylindrical ring made of FC 230 (case iron) is disposed on the predetermined surface (machined surface) of the test specimen. A thrust load (load to be applied in a direction along the rotary axis of the ring) to be applied is changed for each constant time while rotating the ring at a constant rotational speed of 1000 rpm. The frictional coefficient at the surface pressure (thrust load/facing area between the ring and the test specimen which face each other with the oil interposed therebetween) of a predetermined magnitude is obtained by measuring a radial load (load in a direction perpendicular to the rotary shaft of the ring) when the thrust load of a predetermined magnitude is applied. Oil with a low viscosity (0 W to 20) is used as oil being disposed between the ring and the test specimen. Thereafter, the frictional coefficient is normalized with the value of a predetermined frictional coefficient being taken as 1, and is illustrated in a graph.

According to the result of the friction test 1 illustrated in each of FIGS. 9 to 13, the frictional coefficient at the surface pressure of 25 MPa or less in any one of Reference Examples 1 to 4 is less than that of Comparative Example 1 by approximately 20% to 50%. Accordingly, when the laser ablation process is performed in such a manner that the plurality of concave portions with each having the opening width D1 of 20 µm or greater and 60 µm or less are formed with a predetermined pitch interposed therebetween, it is ascertained that it is possible to sufficiently decrease the frictional coefficient further than that of Comparative Example 1 in which the laser ablation process is not performed. In particular, in Reference Examples 1 and 2 in each of which the opening width D1 of 20 µm is formed, it is ascertained that it is possible to considerably reduce the frictional coefficient at a large surface pressure of not only 25 MPa or less but also 25 MPa or greater. It is considered that the oil is sufficiently stored in the concave portions formed in the test specimen, thereby reducing the frictional force of the surface of the test specimen, and decreasing the frictional coefficient.

As a result, it is ascertained that it is possible to improve the performance of the internal combustion engine because the frictional force can be sufficiently reduced even after the resin layer peels from the piston by forming the concave portions of this disclosure in the skirt section that is the sliding portion of the sliding component (piston) of the internal combustion engine, and an increase in the temperature of the internal combustion engine induced by an increase in frictional force can be prevented from causing engine seizure and energy loss.

In Reference Example 4 in which the plurality of concave portions, the opening width D1 of each of which is 60 µm and the pitch L1 of each of which is 210 µm, the frictional coefficient at the surface pressure of 25 MPa or greater increases sharply. It is considered that since the oil on the surface of the test specimen is insufficient, engine seizure occurs. It is considered that a large number of concave portions per unit area are preferably provided because it is possible to effectively supply the oil to the surface of the piston main body. In contrast, in any one of Reference Examples 1 to 4 and Comparative Example 1, the frictional coefficient increases further as the surface pressure increases. That is, when the excessive provision of the concave portions per unit area excessively reduces the facing area between the piston main body and the cylinder which face each other with the oil interposed therebetween, the facing area between the respective surfaces of the piston main body and the cylinder are excessively reduced, thereby increasing the frictional force of the surface of the piston main body.

According to the results, for example, as in Reference Example 1 and Reference Example 2, it is considered that a sufficient facing area between the piston main body and the cylinder facing each other with the oil interposed therebetween is preferably secured while a moderately large number of concave portions per unit area are provided and the oil reservoirs are formed because it is possible to prevent an increase in the frictional force of the surface of the piston main body, and it is possible to prevent an occurrence of the seizure of the piston main body. It is considered that the same result is obtained even before the resin layer peels from the piston. That is, it is considered that a moderately large number of hole portions per unit area are preferably provided in the resin layer so as to correspond to the concave portions of the piston main body because it is possible to prevent an increase in the frictional force of the surface of the piston main body or the surface of the piston (resin layer), and it is possible to prevent an occurrence of the seizure of the piston main body (piston).

Example

Subsequently, a friction test 2 will be described with reference to FIGS. 2, 3, and 14 to 16 so as to confirm the effects of preventing the seizure of a test specimen with a resin layer in Example.

In the friction test 2 of Example according to this disclosure, a flat plate made of aluminum alloy is prepared. A predetermined surface of the flat plate is polished to have the roughness Ra of 0.3 μm or less. The predetermined polished surface is provided with a resin layer of a thickness of 7.0 μm, which is made of thermosetting resin. Thereafter, the laser ablation process is performed in which a laser beam having an ultrashort pulse is applied to a region provided with the resin layer under predetermined laser beam application conditions under which the width of the laser beam is approximately 700 fs and the energy of the laser beam is approximately 10 μJ. In this manner, a plurality of hole portions (refer to FIG. 3) are formed in the resin layer, and concave portions (refer to FIG. 3) are formed in the portions of the flat plate, which correspond to the plurality of hole portions. The laser beam application conditions are adjusted in order for the opening width D1 of the concave portion to be 20 μm. The plurality of concave portions are provided in the entirety of the region provided with the resin layer in a regular pattern so as to line up in two directions (the X direction and the Z direction in FIG. 2) perpendicular to each other in an in-plane direction, with the pitch L1 (refer to FIG. 2) of the 80 μm interposed between the concave portions. Accordingly, the test specimen of Example (mirror surface/resin layer+laser hole) is manufactured.

In contrast, a test specimen (mirror surface/resin layer+ laser hole) of Comparative Example 2 is manufactured similar to Example, except that the laser ablation process is not performed. That is, in Comparative Example 2, the test specimen without the hole portions formed in the resin layer and the concave portions formed in the flat plate is used.

A test specimen (streak/resin layer) of Comparative Example 3 is manufactured similar to Comparative Example 2, except that muscle-shaped streaks (concavities and convexities) of the roughness Ra of approximately 6.3 μm are formed in a predetermined surface of the flat plate instead of a mirror surface process.

Similar to the friction test 1, the frictional coefficient of the predetermined surface of each of the test specimens of Examples and Comparative Examples 2 and 3 is measured by the thrust cylinder-type (Suzuki type) test method.

Figure 14:
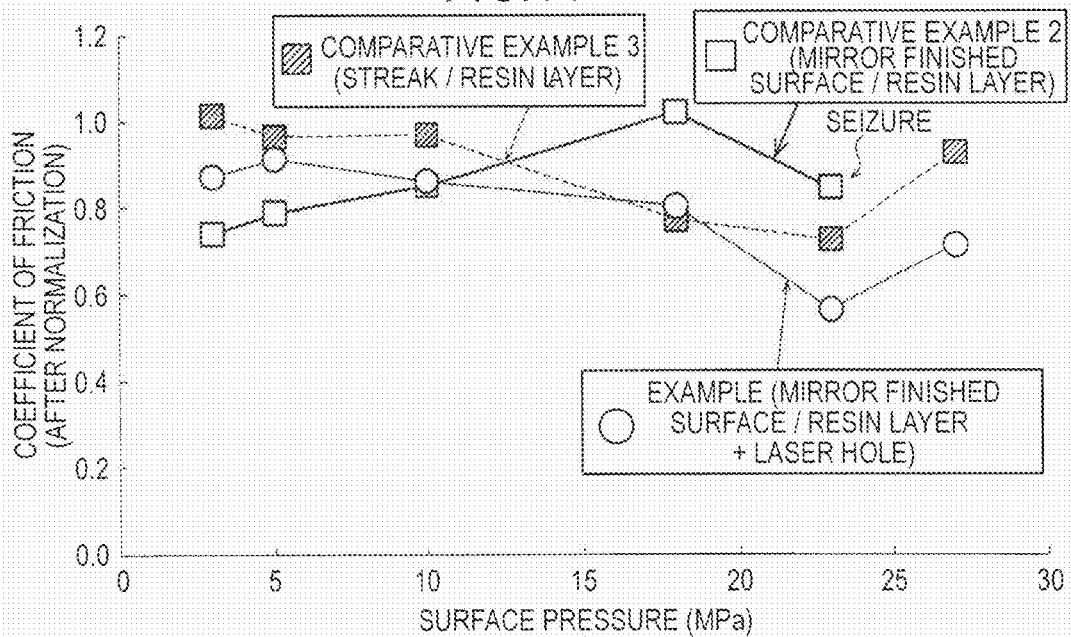
FIG. 14 is a graph illustrating the results of the friction tests performed to confirm the effects of this disclosure.

According to the result of the friction test 2 illustrated in FIG. 14, when Example ((mirror surface/resin layer+laser hole), white circle) and Comparative Example 2 ((mirror surface/resin layer), white rectangle) are compared to each other, the frictional coefficient at the surface pressure of up to 10 MPa in Example is greater that of Comparative Example 2. It is considered that at the surface pressure of up to 10 MPa, the frictional force of the surface of the test specimen of Example becomes greater than that of Comparative Example 2 because the resin layer does not peel from the test specimen in each of Example and Comparative Example 2, and the facing area between the test specimen and the ring used in the test is greater than that of Comparative Example 2 due to the hole portions being provided in Example. In contrast, at the surface pressure of 10 MPa, the frictional coefficient of Example is substantially equal to that of Comparative Example 2, and at the surface pressure of 18 MPa and onward, the frictional coefficient of Example is smaller than that of Comparative Example 2. It is considered that at the surface pressure of 10 MPa to 18 MPa, the frictional force of the surface of the test specimen of Comparative Example 2 becomes greater than that of Example because the resin layer peels from the test specimen in Comparative Example 2, the concave portions are not formed, and the oil is not sufficiently supplied to the surface of the test specimen from which the resin layer peels in Comparative Example 2. As a result, it is ascertained that compared to Comparative Example 2 in which the hole portions and the concave portions are not formed, the resin layer is unlikely to peel (be worn) from the test specimen, and thus it is possible to extend the life of the resin layer by forming the resin layer, and then forming the hole portions and the concave portions as illustrated in Example. It is considered that the resin layer is unlikely to peel (be worn) from the test specimen because the oil is supplied to the surface of the resin layer from the oil reservoirs formed by the hole portions and the concave portions.

In addition, at the surface pressure of 27 MPa, the frictional coefficient in Example is not considerably changed, however, the frictional coefficient in Comparative Example 2 increases sharply. That is, in Comparative Example 2, the seizure of the test specimen occurs. According to the results, it is confirmed that it is possible to prevent an increase in the frictional force of the piston main body (piston), and it is possible to prevent an occurrence of the seizure of the piston main body (piston) by providing the plurality of hole portions in the surface of the piston (resin layer), and providing the concave portions in the surface of the piston main body.

When Example (mirror surface/resin layer+laser hole), while circle) and Comparative Example 3 ((streak/resin layer), black rectangle) are compared to each other, the frictional coefficient in Example is less than that in Comparative Example 3 at substantially the entire surface pressures. It is ascertained that it is possible to further reduce the frictional coefficient in Example in which the resin layer is formed and then the hole portions and the concave portions are formed, compared to Comparative Example 3 in which the streaks are provided, and then the resin layer is formed.

According to the results, it is ascertained that the resin layer is unlikely to peel from the test specimen, it is possible to prevent an occurrence of the seizure of the test specimen even after the resin layer peels from the test specimen, and it is possible to maintain a small frictional coefficient, by forming the resin layer, and then forming the hole portions and the concave portions as illustrated in Example.

Figure 15:
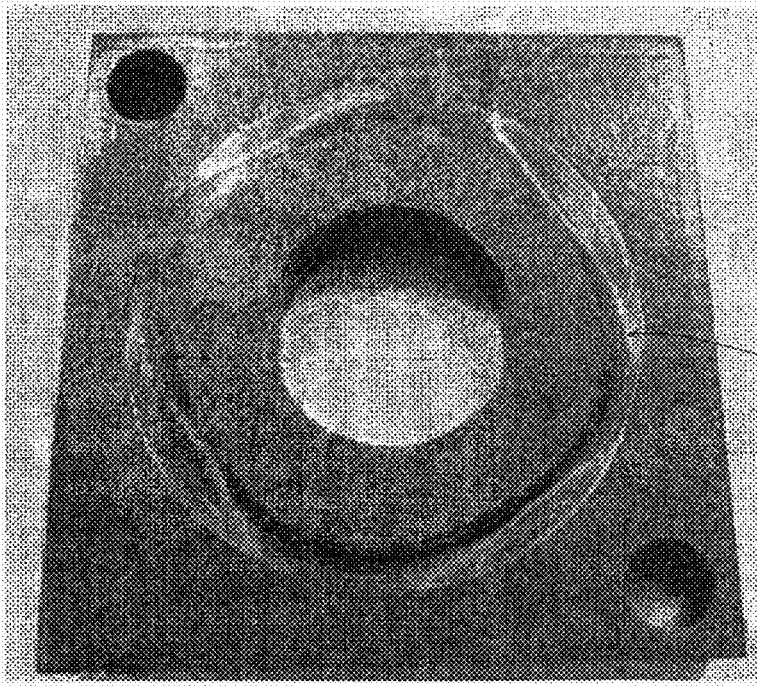
FIG. 15 is a picture illustrating a test specimen of Example after being tested for the friction.
Figure 16:
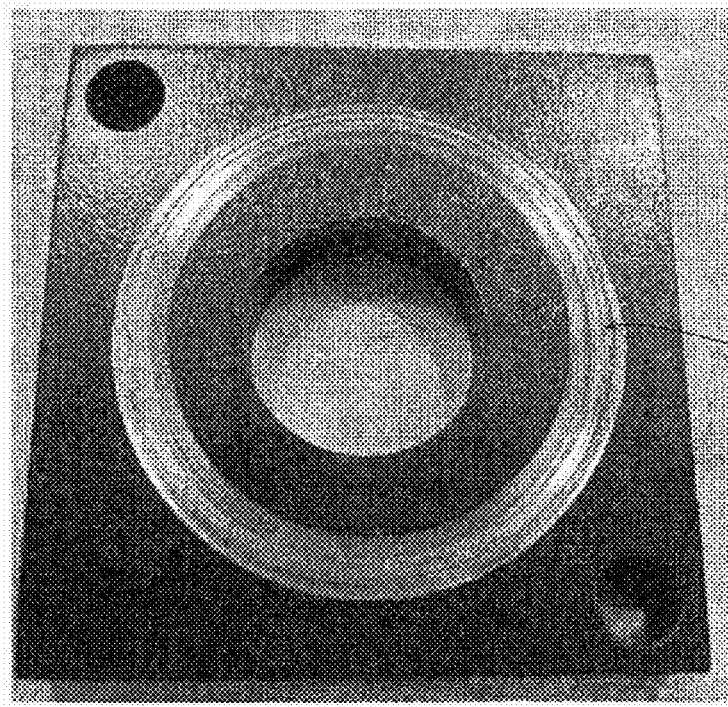
FIG. 16 is a picture illustrating a test specimen of Comparative Example 2 after being tested for the friction.

According to the picture in FIG. 15 illustrating the test specimen of Example which is tested for the friction, in a ring-shaped test region in which the ring used in the friction test is disposed, a part (black portion) of the resin layer remains left, and the metal surface of the test specimen is not significantly exposed. In contrast, according to the picture in FIG. 16 illustrating the test specimen of Comparative Example 2, in the ring-shaped test region, the resin layer peels completely from the test specimen, the metal surface of the metallic color is exposed, and concavities and convexities are formed in the metal surface. That is, in Comparative Example 2, the seizure of the test specimen occurs. According to the results, it is confirmed that the resin layer is unlikely to peel (be worn) from the test specimen, and thus it is possible to extend the life of the resin layer by forming the resin layer, and then forming the hole portions and the concave portions.

It should be considered that the embodiment, Reference Examples, and Example disclosed here are illustrated as examples in all aspects, and this disclosure is not limited thereto. The scope of this disclosure is not limited to the embodiment, Reference Examples, and Example, and includes the scope of the appended claims, the meaning equivalent to the scope of the appended claims, and all changes within the scope.

For example, in the embodiment, the concave portions 12 and the resin layer 2 are formed in the piston 100 used in the internal combustion engine of the vehicle, however, this disclosure is not limited to the configuration in the embodiment. For example, concave portions and a resin layer may be formed in a piston used in an internal combustion engine of a ship, an airplane, or the like. The concave portions and the resin layer may be formed in a cylinder that slides against the piston.

In the embodiment, the concave portions 12 and the resin layer 2 are formed in the skirt section 11 of the piston 100 used in the internal combustion engine, however, this disclosure is not limited to the configuration in the embodiment. For example, the concave portions and the resin layer may be formed in a predetermined region of a piston pin hole of the piston, in which a piston pin is inserted, and which slides against the cylinder.

Figure 17:
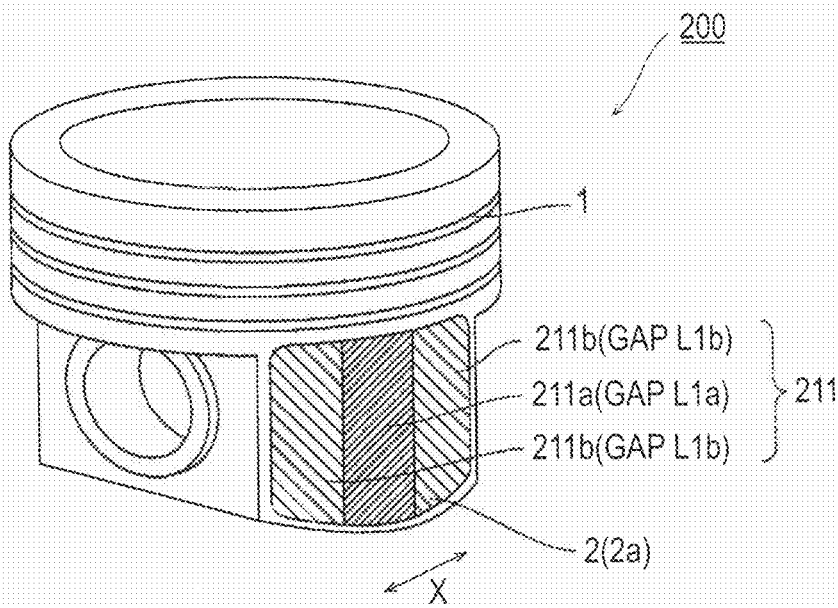
FIG. 17 is a perspective view illustrating a piston according to Modification Example 1 of this disclosure.

In the embodiment, the plurality of concave portions 12 and the plurality of hole portions 21 are provided in a single regular pattern in substantially the entirety of the skirt section 11, however, this disclosure is not limited to the configuration in the embodiment. For example, in this disclosure, the plurality of concave portions and the plurality of hole portions may be formed in a regular pattern that is obtained by combining together a plurality of patterns. Specifically, in a piston 200 of Modification Example 1 illustrated in FIG. 17, a plurality of concave portions and a plurality of hole portions are formed in a center portion 211a of a skirt section 211 so as to line up in the X direction and the Z direction with a pitch L1a interposed therebetween, in which the center portion 211a in the X direction is likely to face the cylinder with the oil interposed therebetween when sliding against the cylinder (refer to FIG. 2). In contrast, the plurality of concave portions and the plurality of hole portions may be formed in opposite end portions 211b which are other portions in the X direction, so as to line up in the X direction and the Z direction with a pitch L1b interposed therebetween which is greater than the pitch L1a. Accordingly, since it is possible to reduce the number of concave portions per unit area and the number of hole portions per unit area in opposite end portions 211b while reducing frictional force by forming a sufficient numbers of the concave portions and the hole portions in the center portion 211a in the X direction which is likely to face the cylinder with the oil interposed therebetween when sliding against the cylinder, it is possible to reduce the time required for manufacturing the piston 200 in which the plurality of concave portions and the plurality of hole portions are formed. The piston 200 is an example of the "sliding component for an internal combustion engine" of this disclosure, and the skirt section 211 is an example of the "predetermined portion" and the "sliding portion" of this disclosure.

Figure 18:
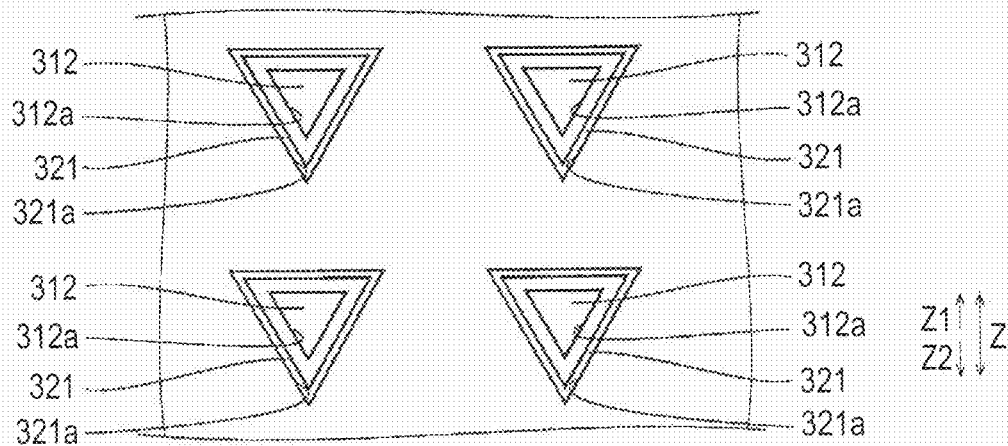
FIG. 18 is an enlarged view of a skirt section of Modification Example 2 of this disclosure.

In the embodiment, the concave portion 12 with the opening end edge 12a of a substantially circular shape is formed, and the hole portion 21 with the opening end edge 21a of a substantially circular shape is formed, however, this disclosure is not limited to the configuration in the embodiment. In this disclosure, the shape of the opening end edge of each of the concave portion and the hole portion is not limited to a circular shape. For example, as in Modification Example 2 illustrated in FIG. 18, an opening end edge 312a of a concave portion 312 and an opening end edge 321a of a hole portion 321 may have a substantially equilateral triangular shape. At this time, the substantially equilateral triangle is preferably provided upside down (state in which one angle is positioned downward (in a Z2 direction) of other two angles). Accordingly, the concave portion 312 and the hole portion 321 can sufficiently store the oil supplied from the top (in the Z1 direction) of the piston. It is possible to easily form the substantially equilateral triangular shape of each of the opening end edge 312a of the concave portion 312 and the opening end edge 321a of the hole portion 321, by moving a laser beam application point along a triangular shape. The opening end edge of each of the concave portion and the hole portion may have a substantially elliptical shape or a substantially isosceles triangular shape. The shape of the opening end edge of the concave portion may be different from that of the opening end edge of the hole portion.

In the embodiment, the concave portion 12 of a substantially inverted conical shape and the hole portion 21 of a substantially inverted conical shape are formed, however, this disclosure is not limited to the shape in the embodiment. For example, in this disclosure, the concave portion may have a substantially inverted truncated circular cone shape, and the hole portion may have a substantially truncated conical shape.

In the embodiment, the inner circumferential surface 21b of the hole portion 21 and the opening end edge 12a of the corresponding concave portion 12 have substantially the respective circular shapes (concentric circular shapes), the centers of which coincide substantially with each other when seen from the depth direction (Y direction) in which the center line A of the hole portion 21 extends, however, this disclosure is not limited to the surface in the embodiment. In this disclosure, the inner circumferential surface of the hole portion and the opening end edge of the corresponding concave portion may not have a concentric circular shape in which the respective centers of the inner circumferential surface and the opening end edge deviate from each other so as not to coincide with each other. At this time, the hole portion and the concave portion are preferably formed in such a manner that the surface of the concave portion is exposed via the corresponding hole portion.

In the embodiment, the piston main body 1 (sliding component main body) is made of aluminum alloy, however, this disclosure is not limited to the material in the embodiment. In this disclosure, the sliding component main body may be made of metallic materials such as iron alloy other than aluminum alloy. The sliding component main body may be made of materials such as heat resistant resin other than a metallic material. Al—Si—Cu—Ni—Mg alloy such as AC8A, Al—Si—Cu—Ni alloy, Al—Cu—Ni—Mg alloy, or the like is preferably used as the aluminum alloy used to manufacture the sliding component main body.

In the embodiment, the resin layer 2 (coating layer) made of heat resistant thermosetting resin, however, this disclosure is not limited to the material in the embodiment. In this disclosure, the coating layer is not limited to resin. For example, the coating layer may be formed of a metallic plating layer made of NI plating, Sn plating, Fe plating, or the like, a diamond-like carbon (DLC) film, an alumite film, or the like.

In the manufacturing process of the embodiment, the surface 11a of the skirt section 11 of the piston main body 1 is polished into a mirror surface in such a manner that the roughness (arithmetic mean roughness) Ra becomes approximately 0.3 μm or less, however, this disclosure is not limited to that in the embodiment. In this disclosure, the surface of the skirt section may be polished in such a manner that the roughness Ra becomes a value (for example, approximately 0.4 μm) greater than approximately 0.3 μm. The surface of the skirt section may not be polished. Accordingly, it is possible to prevent the resin layer formed on the surface of the skirt section from peeling therefrom, and thus it is possible to extend the life of the resin layer, and it is possible to simplify the process of manufacturing the piston.

In the manufacturing process of the embodiment, a laser beam having an ultrashort pulse is applied to the upper surface 2a of the resin layer 2 in the depth direction (Y direction) substantially perpendicular to the upper surface 2a, however, this disclosure is not limited to that in the embodiment. In this disclosure, a laser beam having an ultrashort pulse may be applied obliquely from above to the upper surface of the resin layer. Accordingly, since the hole portion and the concave portion extend obliquely downward, the oil flowing downward due to the gravity can be prevented from excessively flowing out of the hole portion and the concave portion, and as a result, the hole portion and the concave portion can more reliably maintain the oil.

In the manufacturing process of the embodiment, the laser ablation process is performed so as to form the plurality of concave portions 12 and the plurality of hole portions 21, however, this disclosure is not limited to that in the embodiment. In this disclosure, the plurality of concave portions and the plurality of hole portions may be formed by a mechanical process (cutting), a chemical process (etching), or the like.

In the manufacturing process of the embodiment, the laser ablation process uses a laser beam having an ultrashort pulse, the width of which is approximately 700 fs (femtoseconds), and the energy of which is approximately 10 μJ, however, this disclosure is not limited to that in the embodiment. In this disclosure, a laser beam having an ultrashort pulse, the width of which is approximately 50 ns or less, may be used. The pulse width of a laser beam is preferably 1 ps (picosecond) or less. At this time, it is possible to reduce the energy of the laser beam that is applied to a target once, and it is possible to prevent burrs from occurring in the opening end edge of the concave portion. Accordingly, since it is possible to prevent burrs from causing a decrease in facing area between the piston main body (or piston) and the cylinder, it is possible to prevent an increase in surface pressure applied to the portion of the piston main body (or piston), which faces the cylinder with the oil interposed therebetween.

A first aspect of this disclosure is directed to a sliding component for an internal combustion engine including; a sliding component main body that includes a plurality of concave portions formed in a predetermined portion thereof; and a coating layer that covers a portion of the sliding component main body, in which the plurality of concave portions are not formed.

In the sliding component for an internal combustion engine according to the first aspect of this disclosure, as described above, since it is possible to use the plurality of concave portions as the oil reservoirs that store the oil supplied to the internal combustion engine, even after the coating layer formed on the sliding component main body peels therefrom, by providing the plurality of concave portions in the predetermined portion of the sliding component main body, it is possible to supply the oil stored in the plurality of concave portions to the surface of the sliding component main body even when the surface of the sliding component main body is not coated with sufficient oil. Accordingly, since the surface of the sliding component main body can maintain sufficient oil, it is possible to reduce the frictional force of the surface of the sliding component main body.

In the sliding component for an internal combustion engine according to the first aspect of this disclosure, since the coating layer is formed on the sliding component main body, it is possible to prevent the occurrence of a large frictional force on the surface (outer surface of the coating layer) of the sliding component for an internal combustion engine before the coating layer peels from the sliding component main body. Since the coating layer covers the portion of the sliding component main body, in which the plurality of concave portions are not formed, it is possible to use the plurality of concave portions as the oil reservoirs even before the coating layer peels from the sliding component main body. In addition, since the plurality of concave portions are not filled with the coating layer, the filling of the concave portions with the coating layer can be prevented from reducing the capacity of each of the concave portions. Accordingly, since the oil can be sufficiently stored in the plurality of concave portions, and thus, the surface of the sliding component for an internal combustion engine can maintain sufficient oil, it is possible to reduce the frictional force of the surface of the sliding component for an internal combustion engine. As a result, before and after the coating layer peels from the sliding component main body, an increase in the temperature of the internal combustion engine induced by an increase in frictional force can be prevented from causing engine seizure and energy loss, and thereby it is possible to improve the performance of the internal combustion engine.

In the sliding component for an internal combustion engine, in a case where the plurality of concave portions are filled with the coating layer, when the sliding component for an internal combustion engine slides in the internal combustion engine, the coating layer over the concave portions is not significantly scraped off, and in contrast, the coating layer positioned on the surface of the sliding component main body is scraped off. For this reason, the concavities and convexities of the surface of the sliding component for an internal combustion engine disappear gradually, and thus the surface of the sliding component for an internal combustion engine becomes substantially flat, and the surface of the sliding component for an internal combustion engine cannot be sufficiently coated with the oil. In contrast, in the sliding component for an internal combustion engine according to the first aspect of this disclosure, since the plurality of concave portions are not filled with the coating layer, and thus the capacity of each of the concave portions is not affected even when the coating layer is partially scraped off, the surface of the sliding component main body can be prevented from not being sufficiently coated with the oil.

In the sliding component for an internal combustion engine according to the first aspect of this disclosure, it is preferable that the coating layer is provided in a portion of the sliding component main body, which corresponds to the plurality of concave portions, and the coating layer includes a plurality of hole portions which allow the surfaces of the plurality of concave portions to be exposed therethrough, respectively. In this configuration, since the coating layer covers the portion of the sliding component main body, in which the plurality of concave portions are not formed, so as to form the plurality of hole portions, it is thereby possible to dispose the coating layer in a wide range of the sliding component main body compared to when the plurality of hole portions are not respectively formed at the positions corresponding to the plurality of concave portions, and only a part of the sliding component main body is covered with the coating layer, in which the covered part has an island shape, it is possible to prevent the occurrence of a large frictional force on the surface (outer surface of the coating layer) of the sliding component for an internal combustion engine.

At this time, an oil reservoir is preferably formed by both the hole portion of the coating layer and the concave portion of the sliding component main body. In this configuration, it is possible to sufficiently store the oil by also using the hole portions of the coating layer as the oil reservoirs in addition to the concave portions of the sliding component main body. Accordingly, since the surface of the sliding component for an internal combustion engine can maintain sufficient oil before the coating layer peels from the sliding component for an internal combustion engine, it is possible to reduce the frictional force of the surface of the sliding component for an internal combustion engine. Since the oil stored in the hole portion of the coating layer can prevent a sliding component target (target against which the sliding component slides) from coming into direct contact with the coating layer positioned at an opening end edge (angled portion) of the hole portion, it is possible to prevent the coating layer from peeling from the opening end edge of the hole portion.

In the configuration in which the coating layer includes the plurality of hole portions, it is preferable that an inner circumferential surface of the hole portion of the coating layer and an opening end edge of the concave portion of the sliding component main body have respective concentric circular shapes when seen in a direction in which a center line of the hole portion extends. In this configuration, since it is possible to more reliably expose the surfaces of the plurality of concave portions via the plurality of hole portions, respectively, it is possible to more reliably use the plurality of concave portions as the oil reservoirs before the coating layer peels from the sliding component main body.

In the configuration in which the coating layer includes the plurality of hole portions, it is preferable that the inner circumferential surface of the hole portion of the coating layer has an inner diameter greater than that of the opening end edge of the concave portion of the sliding component main body. In this configuration, since it is possible to easily expose the surface of the concave portion of the sliding component main body via the hole portion of the coating layer, which has an inner diameter greater than the inner diameter of the opening end edge, it is possible to reliably use the plurality of concave portions as the oil reservoirs before the coating layer peels from the sliding component main body.

In the configuration in which the coating layer includes the plurality of hole portions, it is preferable that the plurality of hole portions of the coating layer and the plurality of concave portions of the sliding component main body are disposed in a predetermined pattern. In this configuration, since it is possible to reduce variations in the position of each of the plurality of concave portions used as the oil reservoirs, unlike when the plurality of hole portions of the coating layer or the plurality of concave portions of the sliding component are randomly formed, and as a result, it is possible to prevent the surface of the sliding component main body from unevenly maintaining the oil. Accordingly, since it is possible to prevent a portion of the surface of the sliding component main body from maintaining insufficient oil, it is possible to reduce the frictional force of the surface of the sliding component main body.

In the configuration in which the coating layer includes the plurality of hole portions, it is preferable that an outer surface of the coating layer is a flat surface, in which the hole portions are not formed. In this configuration, since it is possible to further increase a facing area between the sliding component for an internal combustion engine and the sliding component target which face each other with the oil interposed therebetween, compared to when the outer surface of the coating layer has a shape with concavities and convexities, it is possible to prevent an increase in surface pressure applied to the portion of the sliding component for an internal combustion engine, which faces the sliding component target. Accordingly, it is possible to effectively prevent an increase in the frictional force of the surface of the sliding component for an internal combustion engine.

In the sliding component main body for an internal combustion engine according to the first aspect of this disclosure, it is preferable that a gap between the adjacent concave portions is greater than an opening width of the opening end edge of the concave portion. In this configuration, since it is possible to prevent a decrease in the gap between the adjacent concave portions, it is possible to secure the portion of the surface of the sliding component main body in which the concave portions are not formed. Accordingly, since it is possible to secure a sufficient facing area between the sliding component main body and the sliding component target which face each other with the oil interposed therebetween after the coating layer peels from the sliding component main body, it is possible to prevent an increase in surface pressure applied to the portion of the sliding component main body, which faces the sliding component target. As a result, it is possible to prevent an increase in the frictional force of the surface of the sliding component main body.

In the sliding component for an internal combustion engine according to the first aspect of this disclosure, it is preferable that the coating layer is made of resin. In this configuration, since it is possible to easily form the coating layer with the flat outer surface by coating the sliding component main body with a resin material, it is possible to prevent an increase in the frictional force of the surface of the sliding component for an internal combustion engine.

In the sliding component for an internal combustion engine according to the first aspect of this disclosure, it is preferable that the sliding component main body includes a piston main body, and the predetermined portion of the sliding component main body includes at least a sliding portion of the piston main body. In this configuration, since even after the coating layer formed on the piston main body peels therefrom, it is possible to use the plurality of concave portions as the oil reservoirs that store the oil supplied to the internal combustion engine, also the surface of the sliding portion of the piston main body can maintain sufficient oil, and as a result, it is possible to reduce the frictional force of the surface of the piston main body.

In the sliding component for an internal combustion engine according to the first aspect of this disclosure, it is preferable that the coating layers are respectively provided in portions corresponding to the plurality of concave portions, and include the plurality of hole portions which allow the surfaces of the plurality of concave portions to be exposed therethrough, respectively, and a gap between the adjacent hole portions is greater than the opening width of the opening end edge of the concave portion.

A second aspect of this disclosure is directed to a method of manufacturing a sliding component for an internal combustion engine including: preparing a sliding component main body; forming a coating layer on a predetermined surface of the sliding component main body; and forming a plurality of hole portions in the coating layer through a laser ablation process in which a laser beam having an ultrashort pulse is applied to the coating layer under predetermined laser beam application conditions, and forming a plurality of concave portions in portions of the sliding component main body, which correspond to the plurality of hole portions, respectively.

In the method of manufacturing the sliding component for an internal combustion engine according to the second aspect of this disclosure, as described above, since it is possible to use the plurality of concave portions as the oil reservoirs that store the oil supplied to the internal combustion engine, even after the coating layer formed on the sliding component main body peels therefrom, by providing the plurality of concave portions in the predetermined portion of the sliding component main body, it is possible to supply the oil stored in the plurality of concave portions to the surface of the sliding component main body even when the surface of the sliding component main body is not coated with sufficient oil. Accordingly, since the surface of the sliding component main body can maintain sufficient oil, it is possible to reduce the frictional force of the surface of the sliding component main body.

In the method of manufacturing the sliding component for an internal combustion engine, since the coating layer is formed on the surface of the predetermined portion of the sliding component main body, it is possible to prevent the occurrence of a large frictional force on the surface (outer surface of the coating layer) of the sliding component for an internal combustion engine before the coating layer peels from the sliding component main body. In addition, the plurality of hole portions are formed on the coating layer, and the plurality of concave portions are formed in the portion of the sliding component main body, which correspond to the plurality of hole portions, respectively, through the laser ablation process. Accordingly, even before the coating layer peels from the sliding component main body, it is possible to use the plurality of concave portions as the oil reservoirs, and after the plurality of concave portions are formed in the sliding component main body, the filling of the concave portions with the coating layer can be prevented from reducing the capacity of each of the concave portions unlike when the plurality of concave portions of the sliding component main body are filled with the coating layer. Accordingly, since the oil can be sufficiently stored in the plurality of concave portions, and thus, the surface of the sliding component for an internal combustion engine can maintain sufficient oil, it is possible to reduce the frictional force of the surface of the sliding component for an internal combustion engine. As a result, before and after the coating layer peels from the sliding component main body, an increase in the temperature of the internal combustion engine induced by an increase in frictional force can be prevented from causing engine seizure and energy loss, and thereby it is possible to improve the performance of the internal combustion engine.

In a case where the sliding component for an internal combustion engine is manufactured by forming the plurality of concave portions in the sliding component main body, and then filling the plurality of concave portions of the sliding component main body with the coating layer, when the sliding component for an internal combustion engine slides in the internal combustion engine, the coating layer over the concave portions is not significantly scraped off, and in contrast, the coating layer positioned on the surface of the sliding component main body is scraped off. For this reason, the concavities and convexities of the surface of the sliding component for an internal combustion engine disappear gradually, and thus the surface of the sliding component for an internal combustion engine becomes substantially flat, and the surface of the sliding component for an internal combustion engine cannot be sufficiently coated with the oil. In contrast, in the method of manufacturing the sliding component for an internal combustion engine according to the second aspect of this disclosure, since the plurality of hole portions are formed on the coating layer, and the plurality of concave portions are formed in the portion of the sliding component main body, which correspond to the plurality of hole portions, respectively, through the laser ablation process, and thus the plurality of concave portions are not filled with the coating layer, the capacity of each of the concave portions is not affected even when the coating layer is scraped off. Accordingly, the surface of the sliding component main body can be prevented from not being sufficiently coated with the oil.

In the method of manufacturing the sliding component for an internal combustion engine according to the second aspect of this disclosure, as described above, since it is possible to concurrently form not only the hole portion of the coating layer but also the concave portion of the sliding component main body by applying the laser beam having an ultrashort pulse to the sliding component main body once, it is not necessary to form a mask, a protective film, or the like compared to when the concave portion and the hole portion are separately formed. Accordingly, it is possible to simplify the process of manufacturing the sliding component for an internal combustion engine. Since compared to when the plurality of concave portions are not respectively formed at the positions corresponding to the plurality of hole portions, and only a part of the sliding component main body is covered with the coating layer, in which the covered part has an island shape, it is possible to dispose the coating layer in a wide range of the sliding component main body by forming the plurality of concave portions at the positions corresponding to the plurality of hole portions, respectively, it is possible to prevent the occurrence of a large frictional force on the surface (outer surface of the coating layer) of the sliding component for an internal combustion engine.

In addition, in the method of manufacturing the sliding component for an internal combustion engine according to the second aspect of this disclosure, as described above, the plurality of hole portions are formed on the coating layer, and the plurality of concave portions are formed in the portion of the sliding component main body, which correspond to the plurality of hole portions, respectively, by the laser ablation process. Accordingly, since it is possible to easily apply a substantially uniform amount of laser beam to the substantially uniform positions (pitch) when forming the hole portions and the concave portions, it is possible to prevent the inner diameter and the formation position of each of the hole portion and the concave portion from becoming irregular, and it is possible to prevent the ejecting of the particles from causing variations in the size (outer diameter and the like) of the sliding component for an internal combustion engine, compared to when forming the hole portions and the concave portions through a process (shot blasting process) in which particles are ejected to the surface at a high speed. As a result, it is possible to form the sliding component for an internal combustion engine with high precision.

In this disclosure, the following configuration of the sliding component for an internal combustion engine according to the first aspect of this disclosure can be considered.

APPENDIX

That is, in the sliding component for an internal combustion engine according to the first aspect of this disclosure, the coating layers are respectively provided in portions of the sliding component main body, which correspond to the plurality of concave portions, and include the plurality of hole portions which allow the surfaces of the plurality of concave portions to be exposed therethrough, respectively, and a gap between the adjacent hole portions is greater than the opening width of the opening end edge of the concave portion. In this configuration, since it is possible to prevent a decrease in the gap between the adjacent hole portions, it is possible to secure a sufficient region on the surface of the coating layer, in which the hole portions are not formed. Accordingly, since it is possible to secure a sufficient facing area between the sliding component (coating layer) for an internal combustion engine and the sliding component target which face each other with the oil interposed therebetween, it is possible to prevent an increase in surface pressure applied to the portion of the coating layer, which faces the sliding component target. As a result, it is possible to prevent an increase in the frictional force of the surface of the sliding component for an internal combustion engine.

According to the aspects of this disclosure, as described above, it is possible to reduce the frictional force of the surface of the sliding component main body even after the coating layer formed on the sliding component main body peels therefrom.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sliding component for an internal combustion engine comprising:
   a sliding component main body that includes a plurality of concave portions formed in a predetermined portion thereof; and
   a coating layer that covers a portion of the sliding component main body, in which the plurality of concave portions are not formed,
   wherein the coating layer is provided in a portion of the sliding component main body, which corresponds to the plurality of concave portions, and the coating layer includes a plurality of hole portions which allow the surfaces of the plurality of concave portions to be exposed therethrough, respectively, and
   wherein an inner circumferential surface of the hole portion of the coating layer and an opening end edge of the concave portion of the sliding component main body have respective concentric circular shapes when seen in a direction in which a center line of the hole portion extends.

2. The sliding component for an internal combustion engine according to claim 1,
   wherein an oil reservoir is formed by both of the hole portion of the coating layer and the concave portion of the sliding component main body.

3. The sliding component for an internal combustion engine according to claim 1,
   wherein the inner circumferential surface of the hole portion of the coating layer has an inner diameter greater than that of the opening end edge of the concave portion of the sliding component main body.

4. The sliding component for an internal combustion engine according to claim 1,
   wherein the plurality of hole portions of the coating layer and the plurality of concave portions of the sliding component main body are disposed in a predetermined pattern.

5. The sliding component for an internal combustion engine according to claim 1,
   wherein an outer surface of the coating layer is a flat surface, in which the hole portions are not formed.

6. The sliding component for an internal combustion engine according to claim 1,
   wherein a gap between the adjacent concave portions is greater than an opening width of the opening end edge of the concave portion.

7. The sliding component for an internal combustion engine according to claim 1,
   wherein the coating layer is made of resin.

8. The sliding component for an internal combustion engine according to claim 1, wherein
   the sliding component main body includes a piston main body, and
   the predetermined portion of the sliding component main body includes at least a sliding portion of the piston main body.

9. The sliding component for an internal combustion engine according to claim 1,
   wherein the coating layer is respectively provided in portions corresponding to the plurality of concave portions, and includes the plurality of hole portions which allow the surfaces of the plurality of concave portions to be exposed therethrough, respectively, and a gap between the adjacent hole portions is greater than the opening width of the opening end edge of the concave portion.

10. A method of manufacturing a sliding component for an internal combustion engine comprising:

preparing a sliding component main body;

forming a coating layer on a predetermined surface of the sliding component main body; and forming a plurality of hole portions in the coating layer through a laser ablation process in which a laser beam having an ultrashort pulse is applied to the coating layer under predetermined laser beam application conditions, and forming a plurality of concave portions in portions of the sliding component main body, which correspond to the plurality of hole portions, respectively, wherein the plurality of hole portions are formed so that inner circumferential surfaces of the hole portions of the coating layer and an opening end edge of the concave portions of the sliding component main body have respective concentric circular shapes when seen in a direction in which a center line of the hole portions extend.

* * * * *